(12) United States Patent
Lehmann et al.

(10) Patent No.: US 10,614,229 B2
(45) Date of Patent: Apr. 7, 2020

(54) SECURITY AND PRIVACY CONTROLS FOR REMOTE-ACCESS SUPPORT SERVICES

(71) Applicant: International Business Machines Corporation, Armonk, NY (US)

(72) Inventors: Stefan Lehmann, Tucson, AZ (US); Erik Rueger, Ockenheim (DE); Christof Schmitt, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 292 days.

(21) Appl. No.: 15/245,321

(22) Filed: Aug. 24, 2016

(65) Prior Publication Data

US 2018/0063080 A1 Mar. 1, 2018

(51) Int. Cl.
*G06F 21/60* (2013.01)
*G06F 21/62* (2013.01)
(Continued)

(52) U.S. Cl.
CPC ............ *G06F 21/602* (2013.01); *G06F 9/452* (2018.02); *G06F 21/6254* (2013.01);
(Continued)

(58) Field of Classification Search
CPC . G06F 21/602; G06F 21/6254; H04L 1/0893; H04L 63/20; H04L 41/28;
(Continued)

(56) References Cited

U.S. PATENT DOCUMENTS 7,360,237 B2 * 4/2008 Engle .................. H04L 63/0272
709/219
7,748,027 B2 * 6/2010 Patrick .................... G06F 21/62
709/224
(Continued)

FOREIGN PATENT DOCUMENTS

CN 1764103 B 5/2010

OTHER PUBLICATIONS

Parizo, Eric, "Secure remote access? Security-related remote access problems abound", Essential Guide | Set up your system for the best network security possible, this was first published in Mar. 2012, 6 pages,<http://searchsecurity.techtarget.com/opinion/Secure-remote-access-Security-related-remote-access-problems-abound>.
(Continued)

*Primary Examiner* — Oleg Korsak
*Assistant Examiner* — Feliciano S Mejia
(74) *Attorney, Agent, or Firm* — Michael A. Petrocelli

(57) ABSTRACT

Security and privacy controls for remote-access support services are provided. A system management policy that is associated with a customer system is identified. A remote-access session is initiated. A first command for execution on the customer system is received via the remote-access session. It is determined that the first command complies with the system management policy, and in response, the first command is executed on the customer system. A first unit of data generated in response to executing the first command is identified. It is determined that providing the
(Continued)

first unit of data to a remote-access support system complies with the system management policy. The first unit of data is provided to the remote-access support system via the remote-access session.

20 Claims, 3 Drawing Sheets

(51) Int. Cl.
*H04L 12/24* (2006.01)
*H04L 29/06* (2006.01)
*H04L 29/08* (2006.01)
*G06F 9/451* (2018.01)

(52) U.S. Cl.
CPC ...... *G06F 21/6263* (2013.01); *H04L 41/0893* (2013.01); *H04L 41/28* (2013.01); *H04L 63/20* (2013.01); *H04L 67/025* (2013.01); *H04L 2209/16* (2013.01)

(58) Field of Classification Search
CPC ..... H04L 2209/16; H04L 67/08; H04L 41/22; H04L 63/105; H04L 67/025; H04L 67/12; H04L 41/0893
USPC .......................................................... 726/1
See application file for complete search history.

(56) References Cited

U.S. PATENT DOCUMENTS

| | | | |
|---|---|---|---|
| 7,757,281 B2 | 7/2010 | Field | |
| 7,949,677 B2 | 5/2011 | Croft | |
| 8,141,143 B2* | 3/2012 | Lee | H04L 63/0281 726/11 |
| 8,176,562 B1 | 5/2012 | Hernacki | |
| 8,266,637 B2 | 9/2012 | Schmieder et al. | |
| 8,745,199 B1 | 6/2014 | Yee et al. | |
| 8,892,778 B2 | 11/2014 | Rao | |
| 9,009,329 B2* | 4/2015 | Malakapalli | H04L 67/08 709/204 |
| 9,032,206 B2 | 5/2015 | Houston et al. | |
| 9,069,973 B2 | 6/2015 | Palanichamy et al. | |
| 9,219,579 B2* | 12/2015 | Rao | H04L 1/1854 |
| 9,560,037 B2* | 1/2017 | Bartz | H04L 63/0823 |
| 10,116,700 B2* | 10/2018 | Ylonen | H04L 63/062 |
| 2006/0031407 A1* | 2/2006 | Dispensa | H04L 29/12009 709/219 |
| 2013/0018803 A1* | 1/2013 | Challu | G06Q 10/06 705/304 |
| 2013/0179939 A1* | 7/2013 | Cherukuri | H04L 63/20 726/1 |
| 2013/0219511 A1* | 8/2013 | Fielding | H04L 63/10 726/27 |
| 2014/0022330 A1 | 1/2014 | Bansal | |
| 2015/0319178 A1* | 11/2015 | Desai | H04W 12/08 726/1 |
| 2016/0364201 A1* | 12/2016 | Beveridge | G06F 3/1454 |

OTHER PUBLICATIONS

"Assist On-Site (AOS) FAQ", IBM Assist On-Site (AOS) FAQ—United States, Technote (troubleshooting), Modified date: Oct. 19, 2010, printed on May 26, 2016, 3 pages, <http://www-01.ibm.com/support/docview.wss?uid=swg21247084>.

* cited by examiner

SECURITY AND PRIVACY CONTROLS FOR REMOTE-ACCESS SUPPORT SERVICES

TECHNICAL FIELD

The present invention relates generally to the field of computer system administration and, more particularly, to security and privacy controls for remote-access support services.

BACKGROUND

After a customer receives a computing product, a vendor of the product may continue to provide support services to the customer. In general, a vendor's support technicians can provide support services via telephone, e-mail, or electronic instant messaging. In addition, some vendors provide support services by, at least in part, remotely accessing a customer's computing system to diagnose and correct any problems with supported products. Remote-access support services are advantageous in that a support technician can often diagnose and correct any problems more quickly by remotely accessing and manipulating a customer's computing system as opposed to relaying instructions to do the same to a customer or a customer's representative. Support technicians can, for example, assist customers with installing and executing various diagnostic and repair applications to remove viruses, repair registries, and resolve device driver issues via remote-access support services.

SUMMARY

According to one embodiment of the present invention, a method for providing security and privacy controls for remote-access support services is provided. The method includes: identifying, by one or more computer processors, a system management policy that is associated with a customer system; initiating, by one or more computer processors, a remote-access session; via the remote-access session, receiving, by one or more computer processors, a first command for execution on the customer system; determining, by one or more computer processors, that the first command complies with the system management policy, and in response, executing, by one or more computer processors, the first command on the customer system; identifying, by one or more computer processors, a first unit of data generated in response to executing the first command; determining, by one or more computer processors, that providing the first unit of data to a remote-access support system complies with the system management policy; and via the remote-access session, providing, by one or more computer processors, the first unit of data to the remote-access support system.

According to another embodiment of the present invention, a computer program product for providing security and privacy controls for remote-access support services is provided. The computer program product comprises a computer readable storage medium and program instructions stored on the computer readable storage medium. The program instructions include: program instructions to identify a system management policy that is associated with a customer system; program instructions to initiate a remote-access session; program instructions to receive, via the remote-access session, a command for execution on the customer system; program instructions to determine that the command complies with the system management policy, and in response, execute the command on the customer system; program instructions to identify data generated in response to executing the command; program instructions to determine that providing the data to a remote-access support system complies with the system management policy; and program instructions to, via the remote-access session, provide the data to the remote-access support system.

According to another embodiment of the present invention, a computer system for security and privacy controls for remote-access support services is provided. The computer system includes one or more computer processors, one or more computer readable storage media, and program instructions stored on the computer readable storage media for execution by at least one of the one or more processors. The program instructions include: program instructions to identify a system management policy that is associated with a customer system; program instructions to initiate a remote-access session; program instructions to receive, via the remote-access session, a command for execution on the customer system; program instructions to determine that the command complies with the system management policy, and in response, execute the command on the customer system; program instructions to identify data generated in response to executing the command; program instructions to determine that providing the data to a remote-access support system complies with the system management policy; and program instructions to, via the remote-access session, provide the data to the remote-access support system.

DETAILED DESCRIPTION

While remote-access support services can quickly resolve issues on a customer's computing system, embodiments of the present invention recognize that remote-access support services can create security and privacy concerns for the customer. Some customer concerns include unauthorized dissemination of confidential data, corruption of data, and unauthorized changes to the customer's system. Due to these concerns, some customers are not willing to utilize remote-access support systems and rely instead on direct, interpersonal communication between support technicians and a customer's representatives to resolve issues. In one example of this alternative scenario, a support technician can telephonically provide instructions that direct a customer's representative to execute specific commands on the customer's system and telephonically describe the outcome. This approach, however, can be error-prone and time-consuming. In another example of this alternative scenario, the support technician provides, via e-mail, the customer's representative with specific commands to execute on the customer's system and instructions to provide any resulting data to the support technician via reply e-mail. This other approach, however, can be equally time-consuming and may not fully address concerns relating to unauthorized dissemination of confidential data due to imperfect e-mail encryption and the vulnerability of the vendor's support systems. Embodiments of the present invention provide security and privacy controls for a remote-access support service to, at least in part, address customer concerns relating to unauthorized dissemination of confidential data, corruption of data, and unauthorized changes to the customer's system.

Figure 1:
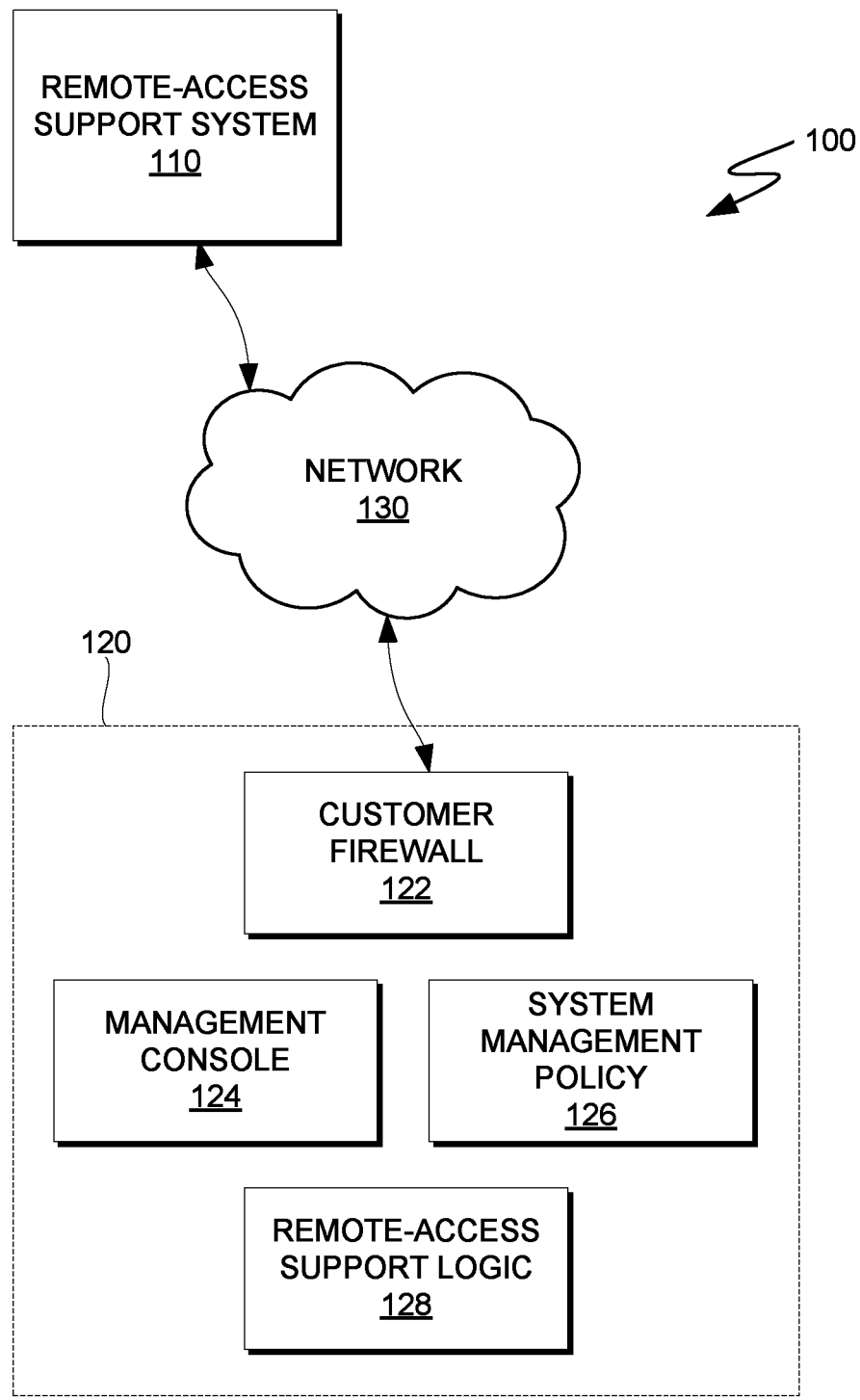
FIG. 1 is a functional block diagram illustrating a computing environment, in accordance with an embodiment of the present invention.

Embodiments of the present invention will now be described in detail with reference to the Figures. FIG. 1 is a functional block diagram illustrating a computing environment, in accordance with an embodiment of the present invention. For example, FIG. 1 is a functional block diagram illustrating computing environment 100. Computing environment 100 includes remote-access support system 110 and customer system 120 connected over network 130. Customer system 120 includes customer firewall 122, management console 124, system management policy 126, and remote-access support logic 128.

In various embodiments, remote-access support system 110 is a computing device that can be or include a standalone device, a server, a laptop computer, a tablet computer, a netbook computer, a personal computer (PC), or a desktop computer. Additionally, remote-access support system 110 can include one or more firewalls and/or one or more proxy servers and any communicatively connected clients in various embodiments of the present invention. In another embodiment, remote-access support system 110 represents a computing system utilizing clustered computers and components to act as a single pool of seamless resources. In general, remote-access support system 110 can be any computing device or a combination of devices with access to customer system 120 such that a support technician can utilize remote-access support system 110 to remotely access customer system 120 to, in accordance with remote-access support logic 128, provide support service(s) for one or more hardware components and/or one or more software components (hereafter referred to as "the supported component(s)") of customer system 120. Remote-access support system 110 and any constituent computing devices can include internal and external hardware components, as similarly depicted and described in further detail with respect to FIG. 3.

Network 130 can be, for example, a local area network (LAN), a wide area network (WAN) such as the Internet, or a combination of the two, and can include wired, wireless, fiber optic or any other connection known in the art. In general, network 130 can be any combination of connections and protocols that will support communications between remote-access support system 110 and customer system 120, in accordance with various embodiments of the present invention.

In various embodiments of the present invention, customer system 120 is a computing device that can be or include a standalone device, a server, a laptop computer, a tablet computer, a netbook computer, a personal computer (PC), or a desktop computer. In some embodiments, customer system 120 represents a computing system utilizing clustered computers and components to act as a single pool of seamless resources. In general, customer system 120 can be any computing device or a combination of computing devices such that (i) customer system 120 can access remote-access support system 110, (ii) customer system 120 includes one or more hardware components and/or one or more software components for which remote-access support system 110 provides support services (i.e., "the supported component(s)"), (iii) execute or access remote-access support logic 128, and (iv) computing remote-access support system 110 can remotely access customer system 120 to provide support services for the supported component(s) in accordance with remote-access support logic 128 and system management policy 126. Customer system 120 and any constituent computing devices can include internal and external hardware components, as depicted and described in further detail with respect to FIG. 3.

In the embodiment depicted in FIG. 1, customer system 120 stores system management policy 126 and remote-access support logic 128 in one or more data repositories (not depicted) on customer system 120. In other embodiments, one or both of system management policy 126 and remote-access support logic 128 can reside on another computing device, provided that remote-access support logic 128 can access system management policy 126, and provided that remote-access support logic 128 can access various components of customer system 120, as described herein. In yet other embodiments, one or both of system management policy 126 and remote-access support logic 128 can be stored externally and accessed through a communication network, such as network 130 (e.g., remote-access support logic 128 can be accessed via a web or cloud-based services).

In general, system management policy 126 represents, at least in part, a collection of rules that governs the resources that a support technician is able to remotely access on customer system 120, the types of actions that the support technician is able to take on customer system 120 (e.g., read/write permissions with respect to various resources of customer system 120), and whether or not anonymization is required with respect to any data that is made available to the support technician. As discussed in greater detail with respect to FIG. 2, remote-access support logic 128 operates, at least in part, to ensure that any commands received from remote-access support system 110 and any outgoing data from customer system 120 are in compliance with system management policy 126. Stated differently, remote-access support logic 128 provides a customer with control over the actions that a support technician can take on customer system 120 and the information that the support technician can access with respect to customer system 120 and/or data stored thereon.

In the embodiment depicted in FIG. 1, customer system 120 includes customer firewall 122. In various embodiments, customer firewall 122 represents a network-layer firewall, an application-firewall, or a proxy server providing security features with respect to incoming and outgoing traffic on customer system 120. In some embodiments of the present invention, remote-access support logic 128 resides and/or executes on customer firewall (e.g., embodiments in which customer firewall 122 represents a proxy server that stores and executes remote-access support logic 128) or another type of firewall compute node. In other embodiments, customer firewall 122 is omitted and remote-access support logic resides and executes on another component of customer system 120 or another computing device within computing environment 100, as described herein.

In the depicted embodiment, customer system 120 includes management console 124. In general, management console 124 represents a display and one or more user input devices, such as a mouse and keyboard that enables a user to configure remote-access support logic 128 and/or review (i) commands from remote-access support system 110 prior to execution on customer system 120 and (ii) data prior to transmission to remote-access support system 110. Management console 124 can also enable a user to configure and/or modify system management policy 126 in some embodiments of the present invention. Accordingly, management console 124 provides one or more user interfaces (not depicted) to the user of management console 124 (e.g., a command-line interface or graphical user interface) in order to provide the functionality attributed to management console 124. The user interface operates to receive input from the user via the provided user interface, thereby enabling the user to configure and interact with system management policy 126 and/or remote-access support logic 128, as described herein, via management console 124. In some embodiments, management console 124 is physically integrated with a computing device that can be a standalone device, a server, a laptop computer, a tablet computer, a netbook computer, a personal computer (PC), a desktop computer, a personal digital assistant (PDA), a smart phone, or any programmable electronic device capable of communicating with the supported components on customer system 120. In other embodiments, management console 124 represents a computing system utilizing clustered computers and components to act as a single pool of seamless resources in order to provide the functionality attributed to management console 124. Management console 124 can include internal and external hardware components, as depicted and described in further detail with respect to FIG. 3. Additionally, the computing device(s) that provide management console 124 can store system management policy 126 and/or execute remote-access support logic 128 in various embodiments of the present invention. In some embodiments of the present invention, the computing device(s) that provide management console 124 include or execute the supported component(s) (i.e., hardware or software components). In other embodiments of the present invention, the computing device(s) that provide management console 124 are communicatively connected to the computing device(s) that include or execute the supported component(s) such that the user of management console 124 is able to, among other things, configure remote-access support logic 128 and/or review (i) commands from remote-access support system 110 prior to execution on customer system 120 and (ii) data prior to transmission to remote-access support system 110.

Figure 2:
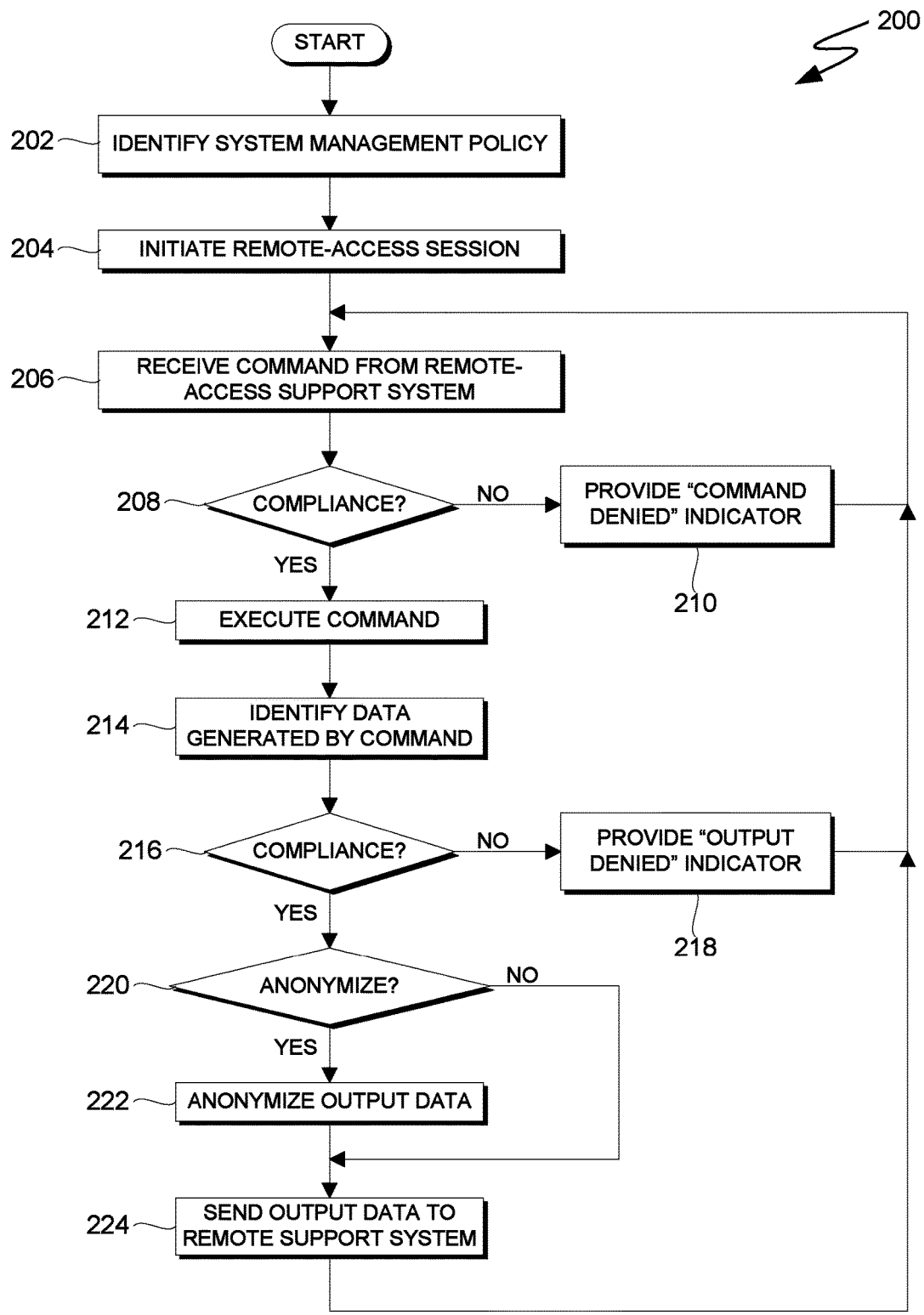
FIG. 2 is a flowchart depicting operations for providing security and privacy controls for remote-access support services, in accordance with an embodiment of the present invention.

FIG. 2 is a flowchart depicting operations for providing security and privacy controls for remote-access support services, in accordance with an embodiment of the present invention. More specifically, FIG. 2 is a flowchart depicting operations 200 of remote-access support logic 128 on a computing device of customer system 120, within computing environment 100.

Operations 200 depict logic that remote-access support logic 128 executes in connection with a "remote-access session." As used herein, a "remote-access session" refers to a period of time in which a user of remote-access support system 110 (e.g., a support technician) is able to remotely access and interact with one or more of the supported component(s) and/or other resources of customer system 120. In various embodiments, the user of remote-access support system 110 interacts with the supported component(s) via a command-line interface, a graphical user-interface (e.g., screen-sharing or remote desktop protocols with respect to a graphical user interface of management console 124), or another type of user interface and remote-access protocol known in the art. Additionally, some embodiments of the present invention enable a user of remote-access support system 110 and a user of customer-support system 120 to exchange verbal and/or textual messages during the remote-access session (e.g., a voice over internet protocol and/or short message service protocol).

In general, remote-access support logic 128 can be one of a plurality of logical components that, at least in part, facilitate remote-access sessions between remote-access support system 110 and customer system 120. For example, remote-access support logic 128 can execute in conjunction with logic for establishing secure electronic communication between remote-access support system 110 and customer system 120. In some embodiments, one or both of remote-access support system 110 and customer system 120 execute logic to enable remote-access support system 110 to remotely access customer system 120 via network 130 and a secure web portal. The web portal can include various security features. In order to log into the web portal, some embodiments require that customer system 120 provide one or more of a user name (e.g., a user name associated with a user of management console 124 or an entity that owns customer system 120), a customer number, and an identifier that is associated with the issue that customer system 120 is experiencing (e.g., a support ticket number). Additionally, remote-access support system 110 can provide customer system 120 with a temporary, single-use, randomly generated access code that customer system 120 must use to log into the web portal. In some embodiments, each remote-access session is associated with randomly generated session keys that are distributed to respective, authorized participants in each remote-access session. Remote-access support logic 128 and any other logical components of that facilitates remote-access sessions can also utilize various forms of encryption, including end-to-end encryption techniques, to secure communications between remote-access support system 110 and customer system 120.

As previously stated, embodiments of the present invention recognize that, despite being an efficient way to obtain technical support, granting remote-access privileges to a support technician can create security and privacy concerns that outweigh the benefits of this type of technical support. Embodiments of the present inventions provide security and privacy controls to, at least in part, address security and privacy concerns with respect to remote-access support services. For example, system management policy 126 represents, at least in part, a collection of rules that governs the resources that a support technician is able to remotely access on customer system 120, the types of actions that the support technician is able to take on customer system 120 (e.g., read/write permissions with respect to various resources of customer system 120), and whether or not anonymization is required with respect to any data or code that is made available to the support technician during a remote-access session. As described herein, remote-access support logic 128 manages remote-access session in accordance with system management policy 126.

In some embodiments, system management policy 126 is created and stored prior to executing and configuring remote-access support logic 128 or initiating a remote-access session; in such embodiments a user of customer system 120 can configure remote-access support logic 128, at least in part, by pointing remote-access support logic 128 to where system management policy 126 is stored via management console 124. In other embodiments, remote-access support logic 128 includes logic for creating system management policy 126 during an initial configuration phase of remote-access support logic 128. In various embodiments, remote-access support logic 128 includes logic that enables a user of customer system 120 to modify system management policy 126 via management console 126 prior to initiating a remote-access session. In the embodiment depicted in FIG. 2, remote-access support logic 128 identifies system management policy 126 (202) prior to initiating a remote-access session (204). In other embodiments, remote-access support logic 128 identifies system management policy 126 (202) and initiates a remote-access session (204) concurrently. In yet other embodiments, remote access support logic 128 identifies system management policy 126 (202) after initiating a remote-access session (204).

In the embodiment depicted in FIG. 2, remote-access support logic 128 initiates a remote-access session (204). Remote-access support logic 128 can initiate the remote-access support logic 128 in response to a user input on management console 124. As described herein, remote-access support logic 128 can include, or execute in conjunction with, logic for establishing secure electronic communication between customer system 120 and remote-access support system 110. In some embodiments of the present invention, remote-access support logic 128 provides one or more remote-access session participants (e.g., one or more support technicians) with log file(s) and/or access privileges in accordance with system management policy 126 during an initial phase of the remote-access session to, at least in part, facilitate diagnosis of any issue(s) that customer system 120 is experiencing.

In response to receiving a command (i.e., executable code) from remote-access support system 110 via the remote-access session (206), remote-access support logic 128 determines whether or not the command complies with various provision(s) of system management policy 126. For example, remote-access support logic 128 can identify any hardware component(s), software component(s), or data file(s) that are effected by the command and determine whether or not system management policy 126 (i) grants privilege(s) (i.e., read, write, and/or execute permissions) that are sufficient to execute the command and/or (ii) permits modification of any component(s) or file(s) that are effected by the command. In some embodiments, remote-access support logic 128 presents the received command on management console 124 upon receipt of the command. If remote-access support logic 128 determines that the command violates (i.e., does not comply with) system management policy 126 (decision 208, NO branch), remote-access support logic 128 provides a "command denied" indicator (210). In various embodiments, the "command denied" indicator can be a textual message, a visual indicator, or any other type of indicator that communicates to the remote-access session participants that the received command cannot be executed. In some embodiments, remote-access support logic 128 enables a user of management console 124 to determine whether or not the received command complies with system management policy 126 and/or override the decision of remote-access support logic 128 (e.g., when the user has sufficient privileges with respect to the supported components(s) on customer system 120) and execute the denied command. If remote-access support logic 128 determines that the command complies with system management policy 126 (decision 208, YES branch), remote-access support logic 128 executes the approved command (212). In some embodiments of the present invention, any commands received via a remote-access session are first executed with respect to a virtualized copy of the supported component(s) (e.g., a virtual machine similarly configured to a physical server experiencing an applicable issue) or on a virtualized representation of one or more components of customer system 120 to prevent any undesirable modifications to customer system 120.

In the embodiment depicted in FIG. 2, remote-access support logic 128 also identifies any data that is generated in response to executing the command (214) and determines whether or not granting one or more remote-access session participants access to the generated data (e.g., granting access to the support technician(s)) complies with system management policy 126 (216). For example, remote-access support logic 128 can determine whether or not system management policy 126 grants privilege(s) (i.e., read permissions) that are sufficient to view any generated data. Some embodiments of remote-access support logic 128 make any data that is generated in response to executing the received command inaccessible to unauthorized participants in the remote-access session prior to a determination as to whether or not any unauthorized participants can access the generated data in compliance with system management policy 126. In general, remote-access support logic 128 identifies computing devices and/or persons associated with customer system 120 as authorized participants and identifies computing devices and/or persons associated with remote-support system 110 as authorized participants. System management policy 126, however, can modify authorizations with respect to any generated data and/or remote-access session participants. If remote-access support logic 128 determines that one or more remote-access session participant cannot access the generated data in compliance with system management policy 126 (decision 216, NO branch), remote-access support logic 128 provides an "output denied" indicator (218). In various embodiments, the "output denied" indicator can be a textual message, a visual indicator, or any other type or combination of indicator(s) that communicates to the remote-access session participants that one or more remote-access session participants (e.g., the support technician(s)) are not permitted to view the data generated in response to executing the received command. In some embodiments, remote-access support logic 128 enables a user of management console 128 to determine whether or not granting one or more remote-access session participants access to the generated data (e.g., granting access to the support technician(s)) complies with system management policy 126 (216). In addition, some embodiments of remote-access support logic 128 enable a user of management console 124 to override the decision of remote-access support logic 128 (e.g., when the user has sufficient privileges with respect to the supported components(s) on customer system 120) and grant one or more remote-access session participants access to the data generated in response to executing the received command. If remote-access support logic 128 determines that granting the remote-access session participants access to the generated data complies with system management policy 126 (e.g., granting the support technician(s) access to the generated data; decision 216, YES branch), remote-access support logic 128 determines whether or not system management policy 126 requires anonymization with respect to any portion of the generated data (220).

As used herein, the process of anonymization and anonymized data, respectively refer to omitting, redacting, or obfuscating data (e.g., by replacing confidential information with placeholder values) and data that has been omitted, redacted, or obfuscated. Anonymization of data is advantageous where customer system 120 stores data that is unnecessary to resolve technical issues with respect to customer system 120 and of which unrestricted distribution violates system management policy 126. For example, storage information, network configuration information, personal information (e.g., user names and user IDs), financial information, and various other types of confidential or sensitive information may be immaterial to the purpose of initiating the remote-access support session and to which granting access may raise security or privacy concerns. If remote-access support logic 128 determines that system management policy 126 requires anonymization, at least in part, of the generated data (decision 220, YES branch), remote-access support logic 128 anonymizes the data in accordance with system management policy 126. If, for example, system management requires anonymization of any logical unit numbers (LUNs) or IP addresses associated with customer system 120 prior to making such information available to unauthorized remote-access session participants, remote-access support logic 128 can omit, redact, or obfuscate any LUNs and IP addresses identified in the generated data. Anonymized data is sent or otherwise made available to users of remote-support system 110 via the remote-support session to facilitate diagnoses and resolutions with respect to issues on customer system 120 (224). Similarly, if remote-access support logic 128 determines that system management policy 126 does not require anonymization of the generated data (decision 220, NO branch), remote-access support logic 128 sends the generated data or otherwise makes the generated data available to users of remote-support system 110 via the remote-support session (224). In some embodiments, remote-access support logic 128 enables a user of management console 124 to override the decision of remote-access support logic 128 to require anonymization (e.g., when the user has sufficient privileges with respect to dissemination of relevant data) and grant one or more remote-access session participants access to the generated data without anonymization. Any additional commands, and any data generated as a result of executing the additional commands, are similarly processed via operations 200 until operations 200 or the remote-access session is terminated.

Figure 3:
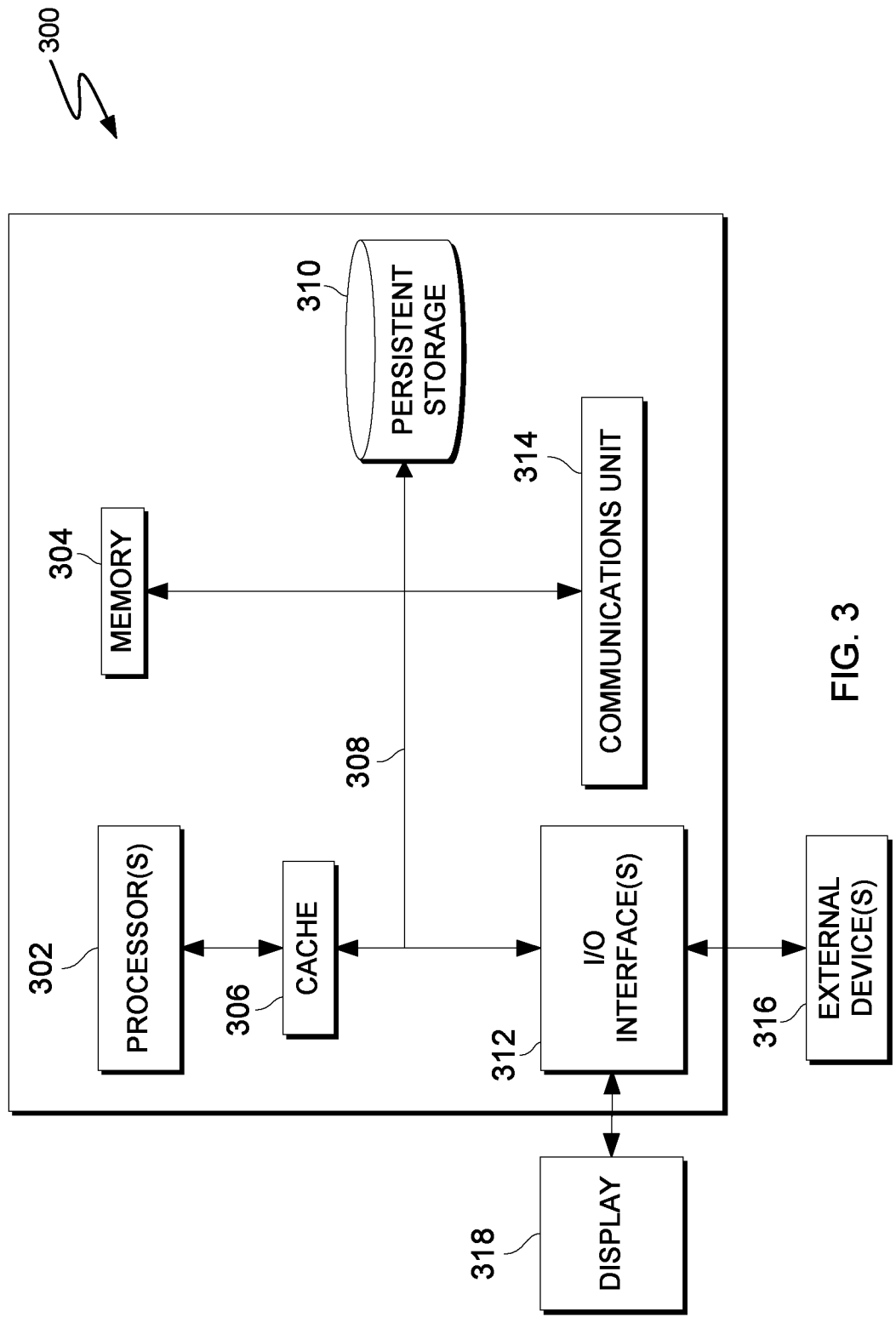
FIG. 3 is a block diagram of components of a computing device executing operations for providing security and privacy controls for remote-access support services, in accordance with an embodiment of the present invention.

FIG. 3 is a block diagram of components of a computing device executing operations for providing security and privacy controls for remote-access support services, in accordance with an embodiment of the present invention. In one embodiment, computing system 300 is representative of a computing device of customer system 120 within computing environment 100 that stores and/or executes remote-access support logic 128.

It should be appreciated that FIG. 3 provides only an illustration of one implementation and does not imply any limitations with regard to the environments in which different embodiments may be implemented. Many modifications to the depicted environment may be made.

Computing system 300 includes processor(s) 302, cache 306, memory 304, persistent storage 310, input/output (I/O) interface(s) 312, communications unit 314, and communications fabric 308. Communications fabric 308 provides communications between cache 306, memory 304, persistent storage 310, communications unit 314, and input/output (I/O) interface(s) 312. Communications fabric 308 can be implemented with any architecture designed for passing data and/or control information between processors (such as microprocessors, communications and network processors, etc.), system memory, peripheral devices, and any other hardware components within a system. For example, communications fabric 308 can be implemented with one or more buses or a crossbar switch.

Memory 304 and persistent storage 310 are computer readable storage media. In this embodiment, memory 304 includes random access memory (RAM). In general, memory 304 can include any suitable volatile or non-volatile computer readable storage media. Cache 306 is a fast memory that enhances the performance of processor(s) 302 by holding recently accessed data, and data near recently accessed data, from memory 304.

Program instructions and data used to practice embodiments of the present invention may be stored in persistent storage 310 and in memory 304 for execution by one or more of the respective processor(s) 302 via cache 306. In an embodiment, persistent storage 310 includes a magnetic hard disk drive. Alternatively, or in addition to a magnetic hard disk drive, persistent storage 310 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 310 may also be removable. For example, a removable hard drive may be used for persistent storage 310. Other examples include optical and magnetic disks, thumb drives, and smart cards that are inserted into a drive for transfer onto another computer readable storage medium that is also part of persistent storage 310.

Communications unit 314, in these examples, provides for communications with other data processing systems or devices. In these examples, communications unit 314 includes one or more network interface cards. Communications unit 314 may provide communications through the use of either or both physical and wireless communications links. Program instructions and data used to practice embodiments of the present invention may be downloaded to persistent storage 310 through communications unit 314.

I/O interface(s) 312 allows for input and output of data with other devices that may be connected to computer system 300. For example, I/O interface(s) 312 may provide a connection to external device(s) 316 such as a keyboard, keypad, a touch screen, and/or some other suitable input device. External device(s) 316 can also include portable computer readable storage media such as, for example, thumb drives, portable optical or magnetic disks, and memory cards. Software and data used to practice embodiments of the present invention can be stored on such portable computer readable storage media and can be loaded onto persistent storage 310 via I/O interface(s) 312. I/O interface(s) 312 also connect to display 318.

Display 318 provides a mechanism to display or present data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, a list of alternatives such as "at least one of A, B, and C" should be interpreted to mean "at least one A, at least one B, at least one C, any combination of A and B, any combination of A and C, any combination of B and C, or any combination of A, B, and C."

Additionally, the phrase "based on" should be interpreted to mean "based, at least in part, on."

The term "exemplary" means of or relating to an example and should not be construed to indicate that any particular embodiment is preferred relative to any other embodiment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for providing security and privacy controls for remote-access support services, the method comprising:

identifying, by one or more computer processors, a system management policy that is associated with a customer system;
automatically initiating, by one or more computer processors, a remote-access session in response to identifying an issue affecting a supported component of the customer system;
via the remote-access session, receiving, by one or more computer processors, a first command for execution on the customer system;
upon receipt of the first command, displaying, by one or more computer processors, the first command on a user interface of a management console, wherein (i) a user of the management console can use the management console to override the system management policy, (ii) each command received during the remote-access session is displayed on the user interface of the management console upon receipt, and (iii) the supported component and the management console each represent a respective computing device within the customer system;
executing, by one or more computer processors, the first command on a virtual copy of the customer system, wherein each command received during the remote-access session is first executed on the virtual copy of the customer system;
determining, by one or more computer processors, that the first command complies with the system management policy, and in response, executing, by one or more computer processors, the first command on the customer system;
identifying, by one or more computer processors, a first unit of data generated in response to executing the first command;
displaying, by one or more computer processors, the first unit of data on the user interface of the management console, wherein any data generated in response to executing each command executed on the customer systems is displayed on the user interface of the management console;
determining, by one or more computer processors, that providing the first unit of data to a remote-access support system complies with the system management policy; and
via the remote-access session, providing, by one or more computer processors, the first unit of data to the remote-access support system.

2. The method of claim 1, further comprising:
determining, by one or more computer processors, that the system management policy requires anonymization of the first unit of data prior to providing the data to the remote-access support system, and in response, anonymizing, by one or more computer processors, the first unit of data in accordance with the system management policy.

3. The method of claim 2, wherein anonymizing, by one or more computer processors, the first unit of data in accordance with the system management policy comprises:
obfuscating, by one or more computer processors, a portion of the first unit of data in accordance with the system management policy.

4. The method of claim 2, wherein anonymizing, by one or more computer processors, the first unit of data in accordance with the system management policy comprises:
redacting, by one or more computer processors, a portion of the first unit of data in accordance with the system management policy.

5. The method of claim 2, wherein anonymizing, by one or more computer processors, the first unit of data in accordance with the system management policy is performed on a firewall compute node.

6. The method of claim 1, further comprising:
via the remote-access session, receiving, by one or more computer processors, a second command for execution on the customer system; and
determining, by one or more computer processors, that the second command violates the system management policy, and in response, providing, by one or more computer processors, a command denied indicator to the remote-access support system via the remote-access session.

7. The method of claim 1, further comprising:
via the remote-access session, receiving, by one or more computer processors, a second command for execution on the customer system;
determining, by one or more computer processors, that the second command complies with the system management policy, and in response, executing, by one or more computer processors, the second command on the customer system;
identifying, by one or more computer processors, a second unit of data generated in response to executing the second command; and
determining, by one or more computer processors, that providing the second unit of data to the remote-access support system violates the system management policy, and in response, providing, by one or more computer processors, an output denied indicator to the remote-access support system via the remote-access session.

8. A computer program product for providing security and privacy controls for remote-access support services, the computer program product comprising:
a computer readable storage medium and program instructions stored on the computer readable storage medium, the program instructions comprising:
program instructions to identify a system management policy that is associated with a customer system;
program instructions to automatically initiate a remote-access session in response to identifying an issue affecting a supported component of the customer system;
program instructions to receive, via the remote-access session, a command for execution on the customer system;
program instruction to, upon receipt of the first command, display the first command on a user interface of a management console, wherein (i) a user of the management console can use the management console to override the system management policy, (ii) each command received during the remote-access session is displayed on the user interface of the management console upon receipt, and (iii) the supported component and the management console each represent a respective computing device within the customer system;
program instruction to execute the first command on a virtual copy of the customer system, wherein the program instructions first execute each command received during the remote-access session on the virtual copy of the customer system;
program instructions to determine that the command complies with the system management policy, and in response, execute the command on the customer system;

program instructions to identify data generated in response to executing the command;

program instructions to display the first unit of data on the user interface of the management console, wherein the program instructions display, on the user interface of the management console, any data generated in response to each command executed on the customer system;

program instructions to determine that providing the data to a remote-access support system complies with the system management policy; and program instructions to, via the remote-access session, provide the data to the remote-access support system.

9. The computer program product of claim 8, the program instructions further comprising:

program instructions to determine that the system management policy requires anonymization of the data prior to providing the data to the remote-access support system, and in response, execute program instructions to anonymize the data in accordance with the system management policy.

10. The computer program product of claim 9, wherein the program instructions to anonymize the data in accordance with the system management policy comprise:

program instructions to obfuscate a portion of the data in accordance with the system management policy.

11. The computer program product of claim 9, wherein the program instructions to anonymize the data in accordance with the system management policy comprise:

program instructions to redact a portion of the data in accordance with the system management policy.

12. The computer program product of claim 9, wherein the program instructions to anonymize the data in accordance with the system management policy are executed on a firewall compute node.

13. The computer program product of claim 8, the program instructions further comprising:

program instructions to determine that the command violates the system management policy, and in response, execute program instructions to provide a command denied indicator to the remote-access support system via the remote-access session.

14. The computer program product of claim 8, the program instructions further comprising:

program instructions to determine that providing the data to the remote-access support system does not comply with the system management policy, and in response, execute program instructions to provide an output denied indicator to the remote-access support system via the remote-access session.

15. A computer system for providing security and privacy controls for remote-access support services, the computer system comprising:

one or more computer processors;

one or more computer readable storage media;

program instructions stored on the one or more computer readable storage media for execution by at least one of the one or more processors, the program instructions comprising:

program instructions to identify a system management policy that is associated with a customer system;

program instructions to automatically initiate a remote-access session in response to identifying an issue affecting a supported component of the customer system;

program instructions to receive, via the remote-access session, a command for execution on the customer system;

program instruction to, upon receipt of the first command, display the first command on a user interface of a management console, wherein (i) a user of the management console can use the management console to override the system management policy, (ii) each command received during the remote-access session is displayed on the user interface of the management console upon receipt, and (iii) the supported component and the management console each represent a respective computing device within the customer system;

program instruction to execute the first command on a virtual copy of the customer system, wherein the program instructions first execute each command received during the remote-access session on the virtual copy of the customer system;

program instructions to determine that the command complies with the system management policy, and in response, execute the command on the customer system;

program instructions to identify data generated in response to executing the command;

program instructions to display the first unit of data on the user interface of the management console, wherein the program instructions display, on the user interface of the management console, any data generated in response to each command executed on the customer system;

program instructions to determine that providing the data to a remote-access support system complies with the system management policy; and program instructions to, via the remote-access session, provide the data to the remote-access support system.

16. The computer system of claim 15, the program instructions further comprising:

program instructions to determine that the system management policy requires anonymization of the data prior to providing the data to the remote-access support system, and in response, execute program instructions to anonymize the data in accordance with the system management policy.

17. The computer system of claim 16, wherein the program instructions to anonymize the data in accordance with the system management policy comprise:

program instructions to obfuscate a portion of the data in accordance with the system management policy.

18. The computer system of claim 16, wherein the program instructions to anonymize the data in accordance with the system management policy comprise:

program instructions to redact a portion of the data in accordance with the system management policy.

19. The computer system of claim 16, wherein the program instructions to anonymize the data in accordance with the system management policy are executed on a firewall compute node.

20. The computer system of claim 15, the program instructions further comprising:

program instructions to determine that providing the data to the remote-access support system does not comply with the system management policy, and in response, execute program instructions to provide an output denied indicator to the remote-access support system via the remote-access session.

\* \* \* \* \*